(12) United States Patent
Wikström et al.

(10) Patent No.: US 12,052,721 B2
(45) Date of Patent: Jul. 30, 2024

(54) GRANTING RESOURCES TO A WIRELESS DEVICE

(71) Applicant: Telefonaktiebolaget LM Ericsson (publ), Stockholm (SE)

(72) Inventors: Gustav Wikström, Täby (SE); Niklas Andgart, Södra Sandby (SE); Laetitia Falconetti, Järfälla (SE); Henrik Sahlin, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 137 days.

(21) Appl. No.: 16/300,649

(22) PCT Filed: May 11, 2017

(86) PCT No.: PCT/EP2017/061394
§ 371 (c)(1),
(2) Date: Nov. 12, 2018

(87) PCT Pub. No.: WO2017/194705
PCT Pub. Date: Nov. 16, 2017

(65) Prior Publication Data
US 2019/0281586 A1   Sep. 12, 2019

Related U.S. Application Data

(60) Provisional application No. 62/335,917, filed on May 13, 2016.

(51) Int. Cl.
*H04W 72/04*   (2023.01)
*H04W 72/044*   (2023.01)
(Continued)

(52) U.S. Cl.
CPC ......... *H04W 72/23* (2023.01); *H04W 72/044* (2013.01); *H04W 72/0446* (2013.01)

(58) Field of Classification Search
CPC .............. H04W 28/16; H04W 72/042; H04W 72/1289; H04W 72/14
See application file for complete search history.

(56) References Cited

U.S. PATENT DOCUMENTS

2010/0279628 A1   11/2010 Love et al.
2010/0304689 A1*  12/2010 McBeath .............. H04W 72/20
                                                        455/68
(Continued)

FOREIGN PATENT DOCUMENTS

CN   10242258 A   4/2012
EP   2733875 A2   5/2014
(Continued)

OTHER PUBLICATIONS

Ericsson, "Design of DL DCI For Short TTI", 3GPP TSG RAN WG1 Meeting #84, Malta, Feb. 15, 2016, pp. 1-5, R1-160931, 3GPP.

(Continued)

*Primary Examiner* — Walli Z Butt
(74) *Attorney, Agent, or Firm* — COATS & BENNETT, PLLC

(57) ABSTRACT

There is provided mechanisms for granting resources to a wireless device operating with a short Transmission Time Interval (sTTI). A method is performed by a network node. The method comprises transmitting, to the wireless device, a first control information message for a downlink channel. The method comprises transmitting, to the wireless device, a second control information message in a device-specific search space (USS), or in a common search space (CSS), based on a parameter of the first control information message.

18 Claims, 3 Drawing Sheets

(51) Int. Cl.
*H04W 72/0446* (2023.01)
*H04W 72/23* (2023.01)

(56) References Cited

U.S. PATENT DOCUMENTS

| | | | |
|---|---|---|---|
| 2014/0071911 | A1 | 3/2014 | Horiuchi et al. |
| 2014/0185540 | A1* | 7/2014 | Gaal ................. H04L 5/0053 370/329 |
| 2015/0257139 | A1 | 9/2015 | Chen et al. |
| 2016/0088604 | A1 | 3/2016 | Patel et al. |
| 2016/0128028 | A1* | 5/2016 | Mallik ............. H04L 1/0039 370/336 |
| 2018/0227886 | A1* | 8/2018 | Chou ................. H04B 7/0695 |
| 2018/0234998 | A1* | 8/2018 | You ................. H04W 72/1273 |
| 2018/0359745 | A1* | 12/2018 | Yeo .................... H04W 72/12 |
| 2018/0375613 | A1* | 12/2018 | Byun ................. H04L 5/0053 |
| 2019/0028162 | A1* | 1/2019 | Lee ................... H04L 1/1861 |
| 2019/0074936 | A1* | 3/2019 | Lee ................... H04L 5/0048 |
| 2019/0141681 | A1* | 5/2019 | Wang ............... H04L 5/1469 |
| 2019/0223204 | A1* | 7/2019 | Kim ................. H04L 5/0053 |

FOREIGN PATENT DOCUMENTS

| | | | |
|---|---|---|---|
| EP | 2947797 | A1 | 11/2015 |
| WO | 2017076459 | A1 | 5/2017 |
| WO | 2017194706 | A1 | 11/2017 |
| WO | 2017194707 | A1 | 11/2017 |
| WO | WO-2017194705 | A1 * | 11/2017 .......... H04W 72/042 |

OTHER PUBLICATIONS

Interdigital, "Short-TTI PDCCH Design", 3GPP TSG RAN WG1 Meeting #84bis, Busan, Korea, Apr. 11, 2016, pp. 1-3, R1-162963, 3GPP.

Nokia et al., "On Design of DL Control Channel for Shorter TTI Operation", 3GPP TSG-RAN WG1 Meeting #84bis, Busan, South Korea, Mar. 11, 2016, pp. 1-5, R1-163267, 3GPP.

Zte, "Downlink Control Channels For Shortened TTI", 3GPP TSG RAN WG1 Meeting #84bis, Busan, Korea, Apr. 11, 2016, pp. 1-7, R1-162405, 3GPP.

3rd Generation Partnership Project, "3rd Generation Partnership Project; Technical Specification Group Radio Access Network; Evolved Universal Terrestrial Radio Access (E-UTRA); Multiplexing and channel coding (Release 10)", Technical Specification, 3GPP TS 36.212 V10.9.0, Sep. 1, 2015, pp. 1-79, 3GPP.

3rd Generation Partnership Project, "3rd Generation Partnership Project; Technical Specification Group Radio Access Network; Study on New Radio Access Technology Physical Layer Aspects (Release 14)", Technical Report, 3GPP TR 38.802 V14.0.0, Mar. 1, 2017, pp. 1-143, 3GPP.

Ericsson, "Short TTI operation with Carrier Aggregation", 3GPP TSG RAN WG1 Meeting #84 bis, Busan, Apr. 11, 2016, pp. 1-3, R1-163324.

* cited by examiner

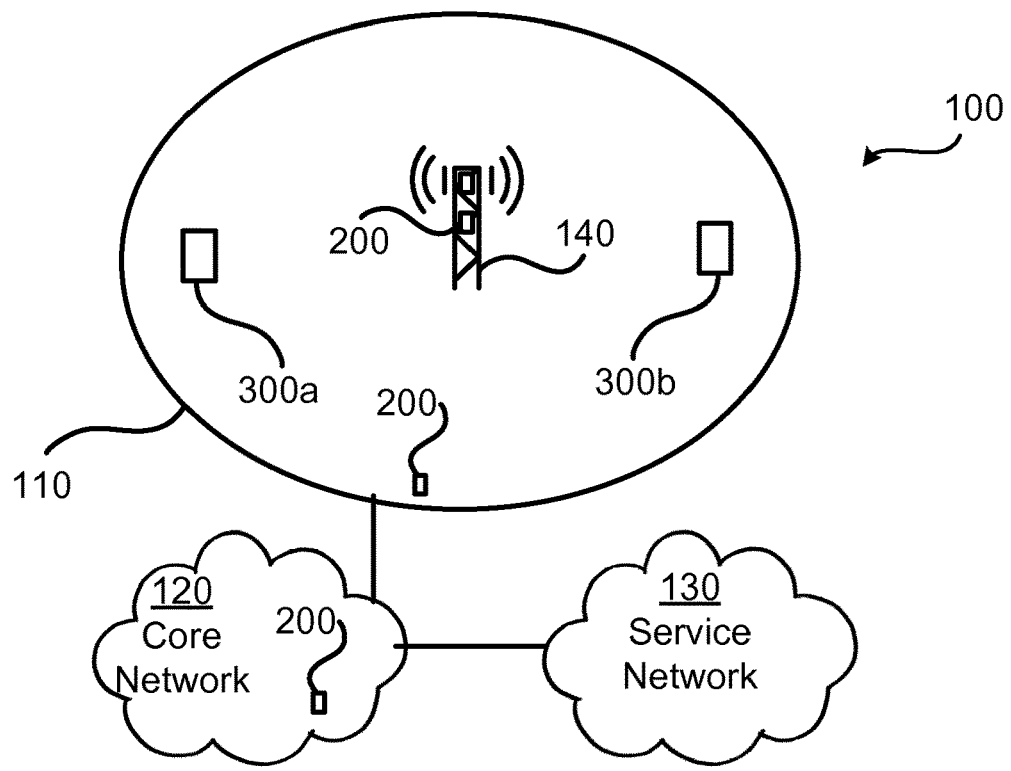
Fig. 1
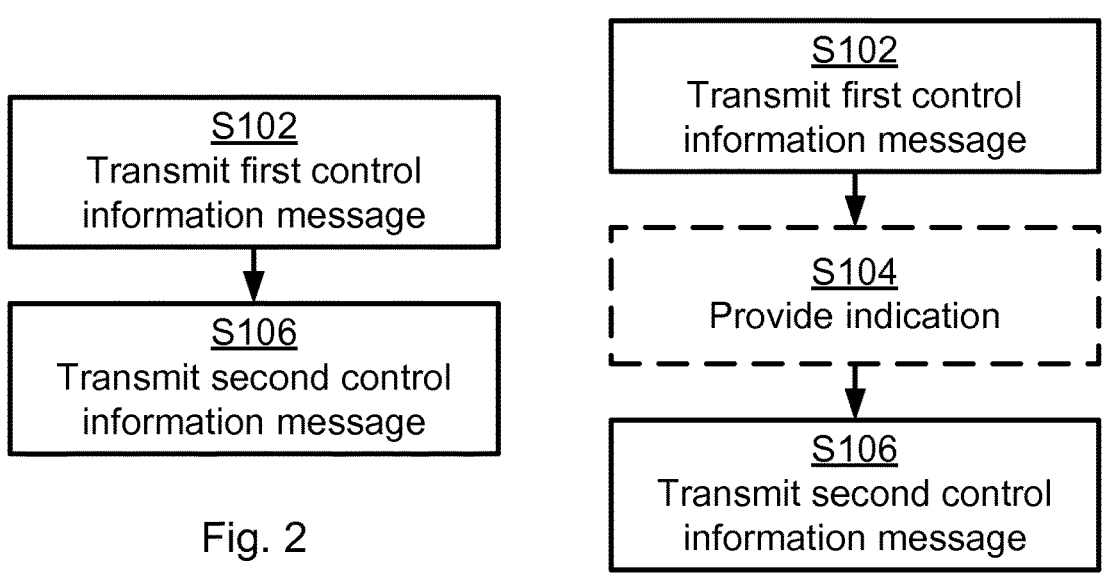
Fig. 2
Fig. 3

GRANTING RESOURCES TO A WIRELESS DEVICE

TECHNICAL FIELD

Embodiments presented herein relate to a method, a network node, a, computer program, and a computer program product for granting resources to a wireless device. Embodiments presented herein further relate to a method, a wireless device, a, computer program, and a computer program product for receiving granting of resources from a network node.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is packet data latency. Latency measurements can be performed in all stages of the communications network, for example when verifying a new software release or system component, and/or when deploying the communications network and when the communications network is in commercial operation.

Shorter latency than previous generations of 3GPP radio access technologies was one performance metric that guided the design of Long Term Evolution (LTE). LTE is also now recognized by the end-users to be a system that provides faster access to internet and lower packet latencies than previous generations of mobile radio technologies.

Packet latency is also a parameter that indirectly influences the throughput of the communications network. Traffic using the Hypertext Transfer Protocol (HTTP) and/or the Transmission Control Protocol (TCP) is currently one of the dominating application and transport layer protocol suite used on the Internet. The typical size of HTTP based transactions over the Internet is in the range of a few 10's of Kilo byte up to 1 Mega byte. In this size range, the TCP slow start period is a significant part of the total transport period of the packet stream. During TCP slow start the performance is packet latency limited. Hence, improved packet latency can potentially improve the average throughput, at least for this type of TCP based data transactions.

Radio resource efficiency could also be positively impacted by packet latency reductions. Lower packet data latency could increase the number of transmissions possible within a certain delay bound; hence higher Block Error Rate (BLER) targets could be used for the data transmissions freeing up radio resources potentially improving the capacity of the system.

The existing physical layer downlink control channels, Physical Downlink Control Channel (PDCCH) and enhanced PDCCH (ePDCCH), are used to carry Downlink Control Information (DCI) such as scheduling decisions for uplink (UL; from device to network) and downlink (DL; from network to device) and power control commands. Both PDCCH and ePDCCH are according to present communications networks transmitted once per 1 ms subframe.

3GPP TS 36.212 lists examples of different (DCI) formats for UL and DL resource assignments. UL scheduling grants use either DCI format 0 or DCI format 4. The latter was added in the 3rd Generation Partnership Project (3GPP) Release 10 (Rel-10) for supporting uplink spatial multiplexing The existing way of operation, e.g. frame structure and control signalling, are designed for data allocations in subframes of a fixed length of 1 ms, which may vary only in allocated bandwidth. Specifically, the current DCIs define resource allocations within the entire subframe, and are only transmitted once per subframe. In legacy LTE the wireless device monitors a predefined device-specific search space for the PDCCH. With the introduction of communications using short subframes the number of blind decoding attempts will increase for a wireless device operating using short subframes.

Hence, there is a need for efficient communications using short subframes.

SUMMARY

An object of embodiments herein is to provide mechanisms for communications using short subframe.

According to a first aspect there is presented a method for granting resources to a wireless device operating with a short Transmission Time Interval (sTTI). The method is performed by a network node. The method comprises transmitting, to the wireless device, a first control information message for a downlink channel, optionally in a common search space (CSS). The method comprises transmitting, to the wireless device, a second control information message in a device-specific search space (USS), or in the CSS, based on a parameter of the first control information message.

According to a second aspect there is presented a network node for granting resources to a wireless device operating with an STTI. The network node comprises processing circuitry. The processing circuitry is configured to cause the network node to transmit, to the wireless device, a first control information message for a downlink channel, optionally in a CSS. The processing circuitry is configured to cause the network node to transmit, to the wireless device, a second control information message in a USS, or in the CSS, based on a parameter of the first control information message.

According to a third aspect there is presented a network node for granting resources to a wireless device operating with an STTI. The network node comprises processing circuitry and a computer program product. The computer program product stores instructions that, when executed by the processing circuitry, causes the network node to perform steps, or operations. The steps, or operations, cause the network node to transmit, to the wireless device, a first control information message for a downlink channel, optionally in a CSS. The steps, or operations, cause the network node to transmit, to the wireless device, a second control information message in a USS, or in the CSS, based on a parameter of the first control information message.

According to a fourth aspect there is presented a network node for granting resources to a wireless device operating with an STTI. The network node comprises a transmit module configured to transmit, to the wireless device, a first control information message for a downlink channel, optionally in a CSS. The network node comprises a transmit module configured to transmit, to the wireless device, a second control information message in a USS, or in the CSS, based on a parameter of the first control information message.

According to a fifth aspect there is presented a computer program for granting resources to a wireless device operating with an STTI, the computer program comprising computer program code which, when run on processing circuitry of a network node, causes the network node to perform a method according to the first aspect.

According to a sixth aspect there is presented a method for receiving granting of resources from a network node. The method is performed by a wireless device operating with an STTI. The method comprises receiving a first control information message for a downlink channel, optionally in a CSS. The method comprises decoding a second control information message in a USS, or in the CSS, based on a parameter of the first control information message.

According to a seventh aspect there is presented a wireless device for receiving granting of resources from a network node. The wireless device is configured for operating with an STTI and comprises processing circuitry. The processing circuitry is configured to cause the wireless device to receive a first control information message for a downlink channel, optionally in a CSS. The processing circuitry is configured to cause the wireless device to decode a second control information message in a USS, or in the CSS, based on a parameter of the first control information message.

According to an eighth aspect there is presented a wireless device for receiving granting of resources from a network node. The wireless device is configured for operating with an STTI and comprises processing circuitry and a computer program product. The computer program product stores instructions that, when executed by the processing circuitry, causes the wireless device to perform steps, or operations. The steps, or operations, cause the wireless device to receive a first control information message for a downlink channel, optionally in a CSS. The steps, or operations, cause the wireless device to decode a second control information message in a USS, or in the CSS, based on a parameter of the first control information message.

According to a ninth aspect there is presented a wireless device for receiving granting of resources from a network node. The wireless device is configured for operating with an STTI and comprises a receive module configured to receive a first control information message for a downlink channel, optionally in a CSS. The wireless device comprises a decode module configured to decode a second control information message in a USS, or in the CSS, based on a parameter of the first control information message.

According to a tenth aspect there is presented a computer program for receiving granting of resources from a network node, the computer program comprising computer program code which, when run on processing circuitry of a wireless device for operating with an STTI, causes the wireless device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously these methods, these network nodes, these wireless devices, and these computer programs provides efficient communications using short subframe.

Advantageously this reduces the total number of blind decodes the wireless device needs to perform when in short TTI operation, and thereby limits the processing load in the wireless device.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent enumerated embodiments as well as from the drawings.

Generally, all terms used in the enumerated embodiments are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communication network according to embodiments;

FIGS. 2, 3, 4, and 5 are flowcharts of methods according to embodiments;

DETAILED DESCRIPTION

Figure 4:
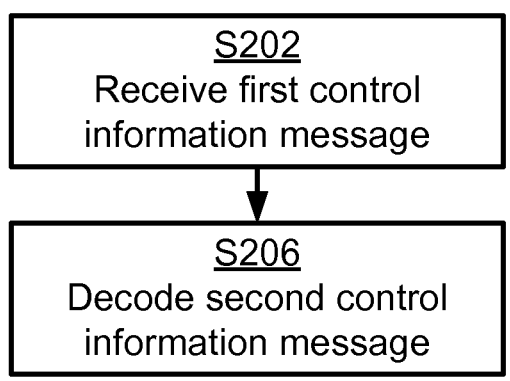

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic diagram illustrating a communications network 100 where embodiments presented herein can be applied. The communications network 100 comprises at least one network node 200. The functionality of the network node 200 and how it interacts with other entities, nodes, and devices in the communications network 100 will be further disclosed below.

The communications network 100 further comprises at least one radio access network node 140. The at least one radio access network node 140 is part of a radio access network 110 and operatively connected to a core network 120 which in turn is operatively connected to a service network 130. The at least one radio access network node 140 provides network access in the radio access network 110. A wireless device 300a, 300b served by the at least one radio access network node 140 is thereby enabled to access services and exchange data with the core network 120 and the service network 130.

Examples of wireless devices 300a, 300b include, but are not limited to, mobile stations, mobile phones, handsets, wireless local loop phones, user equipment (UE), smartphones, laptop computers, tablet computers, network equipped sensors, wireless modems, and Internet of Things devices. Examples of radio access network nodes 120 include, but are not limited to, radio base stations, base transceiver stations, NodeBs, evolved NodeBs, access points, and access nodes. As the skilled person understands, the communications network 100 may comprise a plurality of radio access network nodes 120, each providing network access to a plurality of wireless devices 300a, 300b. The herein disclosed embodiments are no limited to any particular number of network nodes 200, radio access network nodes 120 or wireless devices 300a, 300b.

The wireless device 300a, 300b accesses services and exchanges data with the core network 120 and the service network 130 by transmitting data in packets to the core network 120 and the service network 130 and by receiving data in packets from the core network 120 and the service network 130 via the radio access network node 140.

Packet latency has above been identified as degrading network performance. One area to address when it comes to packet latency reductions is the reduction of transport time of data and control signalling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix.

The embodiments disclosed herein relate to mechanisms for granting resources to a wireless device 300a operating with an sTTI. In order to obtain such mechanisms there is provided a network node 200, a method performed by the network node 200, a computer program product comprising code, for example in the form of a computer program, that when run on processing circuitry of the network node 200, causes the network node 200 to perform the method.

The embodiments disclosed herein further relate to mechanisms for receiving granting of resources from a network node 200. In order to obtain such mechanisms there is further provided a wireless device 300a, 300b operating with an sTTI, a method performed by the wireless device 300a, 300b, and a computer program product comprising code, for example in the form of a computer program, that when run on processing circuitry of the wireless device 300a, 300b, causes the wireless device 300a, 300b to perform the method.

According to embodiment disclosed herein the TTIs are shortened by introducing shortened subframes (below denoted short subframes). With a short TTI (below denoted sTTI), the subframes can be decided to have any duration in time and comprise resources on a number of OFDM or SC-FDMA symbols within (i.e. less than) a 1 ms subframe. As one example, the duration of a short subframe may be 0.5 ms, i.e., seven OFDM symbols or SC-FDMA symbols for the case with normal cyclic prefix.

As mentioned, one way to reduce latency is to reduce the transmission time interval (TTI), and instead of assigning resources with a time duration of 1 ms, there is then a need to assign resources with shorter duration such as a number of OFDM symbols or SC-FDMA symbols. This implies a need for device specific control signalling that enables indication of such short scheduling assignments.

Using scheduling with 1 ms TTIs, the wireless devices 300a, 300b are allocated frequency resources based on, e.g., bitmaps in DCI fields identifying used resource blocks. As the TTI length is shortened, this may lead to an increased signaling overhead if the allocation is specified several times per subframe. Having a grant only to a single wireless device 300a, 300b per such short TTI will limit the overhead. It might be further beneficial to share the frequency resources within a short TTI between several wireless device 300a, 300b, while limiting the amount of control overhead.

A wireless device 300a, 300b can be configured for short TTI operation by being assigned a group short TTI Radio Network Temporary Identifier (RNTI). The wireless device 300a, 300b could then search the common search space (CSS) of the PDCCH for slow grants (comprising a slow Downlink Control Information (DCI) message) scrambled with the short TTI RNTI. This slow grant comprises the frequency allocation for a downlink (DL) and an uplink (UL) short TTI frequency band to be used for short TTI operation. After decoding such a slow grant the wireless device 300a, 300b is in short TTI operation and can extend its search space to an in-band control channel, also defined by the slow grant.

A DCI message is encoded onto a number of Control Channel Elements (CCEs) in the PDCCH region of the DL subframe. The wireless device 300a, 300b searches both in a CSS and a device-specific search space (denoted USS; where U is short for UE as in User Equipment) in the PDCCH for different CCE aggregation levels (AL). The number of DCI message candidates of different sizes in LTE are given in Table 90.1.1-1 in 3GPP TS 36.213 v13.1.1. According to this table there are 22 DCI message candidates to be monitored by the wireless device 300a, 300b, and with 2 different DCI sizes defined for each transmission mode, there are a total of 44 possibilities that the wireless device 300a, 300b has to try with blind decoding.

In legacy LTE the wireless device 300a, 300b monitors a predefined USS for the PDCCH. With the introduction of a new in-band control channel (denoted short PDCCH) the number of blind decoding attempts will increase for a wireless device 300a, 300b in short TTI operation. At the same time this wireless device 300a, 300b needs the USS for any legacy TTI UL grants or DL allocations.

The herein disclosed embodiments enable a reduced USS in the PDCCH to be used when the wireless device 300a, 300b operating with an sTTI has decoded a slow grant for short TTI operation.

Figure 5:
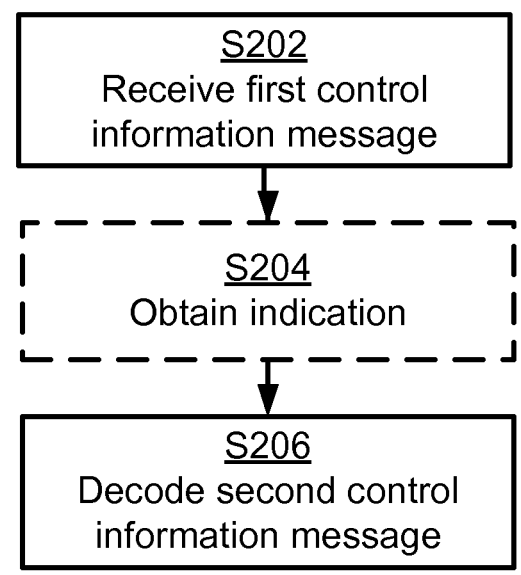

FIGS. 2 and 3 are flow charts illustrating embodiments of methods for granting resources to a wireless device 300a operating with an sTTI as performed by the network node 200. FIGS. 4 and 5 are flow charts illustrating embodiments of methods for receiving granting of resources from a network node 200 as performed by the wireless device 300a, 300b operating with an sTTI. The methods are advantageously provided as computer programs 1020a, 1020b (see below).

Reference is now made to FIG. 2 illustrating a method for granting resources to a wireless device 300a operating with an sTTI as performed by the network node 200 according to an embodiment.

S102: The network node 200 transmits, to the wireless device 300a, a first control information message for a downlink channel in a common search space (CSS). The first control information message could be transmitted in a CSS of a control channel, such as a physical downlink control channel (PDCCH).

S106: The network node 200 transmits, to the wireless device 300a, a second control information message in a device-specific search space (USS), or in the CSS. In some examples, the second control information message is transmitted based on a parameter of the first control information message. In some examples, the parameter indicates that the first control information message is a slow grant.

The second control information message can be a slow grant in a CSS of a PDCCH. The slow grant could define frequency bands for short TTI operation in an uplink and/or downlink channel, e.g. PDSCH and/or a PUSCH for the wireless device 300a. The slow grant could define the sTTI. The second control information message could be comprised in one of the TTI frequency bands. The second control information message is then decodable (by the wireless device 300a) using less than all configured PDCCH candidates in a USS of the PDCCH.

In this respect, in the PDCCH region in a downlink radio frame, there can be many places where a specific PDCCH for the wireless device 300a can be located and, according to prior art, the wireless device 300a searches all these possible locations. The possible location for a PDCCH differs depending on whether the PDCCH is device-specific or common, and also depends on what aggregation level is used. All the possible location for the PDCCH for the wireless device 300a is called the search space (which thus could be device-specific; USS or common; CSS) and each of the possible location is called a PDCCH candidate. The herein disclosed embodiments enables the wireless device 300a to decode of the PDCCH for the wireless device 300a using less than all PDCCH candidates in the USS, i.e., without the wireless device 300a having to search all possible locations of the PDCCH for the wireless device 300a.

The term sTTI, or short TTI, is used to denote a TTI of a short subframe. The short subframe can have a shorter duration in time than 1 ms. The short TTI can be defined as being shorter than the interval between two consecutive PDCCH transmissions (as being transmitted once every 1 ms). To achieve latency reduction the networks node 200 can thus be configured to schedule data on short timeframes, such as at short TTI level.

Embodiments relating to further details of granting resources to a wireless device 300a will now be disclosed.

Reference is now made to FIG. 3 illustrating methods for granting resources to a wireless device 300a operating with an sTTI as performed by the network node 200 according to further embodiments. It is assumed that steps S102, S106 are performed as disclosed with reference to FIG. 2 and a repeated description of these steps is therefore omitted.

As will be further disclosed below, there could be different ways for the wireless device 300a to obtain a definition of which PDCCH candidates to use in the USS. According to some aspects the wireless device 300a is informed of the reduced set of PDCCH candidates by signalling from the network node 200 over radio resource control signalling. Hence, according to an embodiment the network node 200 is configured to perform step S104:

S104: The network node 200 provides, to the wireless device 300a and in a radio resource control message, an indication defining which PDCCH candidates to use in the USS.

Reference is now made to FIG. 4 illustrating a method for receiving granting of resources from a network node 200 as performed by the wireless device 300a, 300b operating with an sTTI according to an embodiment.

As disclosed above, the network node 200 in step S102 transmits a first control information message to the wireless device 300a. It is assumed that the wireless device 300a receives this first control information message. Hence, the wireless device 300a, 300b is configured to perform step S202:

S202: The wireless device 300a, 300b receives the first control information message for a downlink channel in a CSS. The first control information message could be received in a CSS of a control channel, such as a physical downlink control channel (PDCCH).

As disclosed above, the network node 200 in step S106 transmits a second control information message to the wireless device 300a. It is assumed that the wireless device 300a receives this second control information message. Hence, the wireless device 300a, 300b is configured to perform step S206:

S206: The wireless device 300a, 300b decodes the second control information message in a USS, or in the CSS. In some examples, the decoding is based on a parameter of the first control information message. In some examples, the parameter indicates that the first control information message is a slow grant.

A wireless device 300a, 300b in short TTI operation uses a different (reduced set) of USS for short TTI operation in the PDCCH compared to a wireless device in normal TTI operation. Performing steps S202-S206 enables a wireless device 300a, 300b that decodes a slow grant for short TTI operation in the CSS in the PDCCH to switch to a reduced device-specific search space for the PDCCH to find the second control information message, thereby reducing the number of blind decoding attempts.

Reference is now made to FIG. 5 illustrating methods for receiving granting of resources from a network node 200 as performed by the wireless device 300a, 300b operating with an sTTI according to further embodiments. It is assumed that steps S202, S206 are performed as disclosed with reference to FIG. 4 and a repeated description of these steps is therefore omitted.

There could be different ways for the wireless device 300a to obtain a definition of which PDCCH candidates to use in the USS or CSS when attempting to decode the DCI message. As disclosed above, according to an embodiment the network node 200 in step S102 provides an indication defining which PDCCH candidates to use in the USS. Hence, according to an embodiment the wireless device 300a, 300b is configured to perform step S204:

S204: The wireless device 300a, 300b obtains, from the network node 200 and in a radio resource control message, an indication defining which PDCCH candidates to use in the USS. For example, the wireless device is informed of the reduced set by signaling from the network node, e.g. over RRC.

According to an alternative embodiment the definition of which PDCCH candidates to use in the USS is hardcoded in the wireless device 300a, 330b. For example, the wireless device 300a, 330b is configured to only monitor one control message format (e.g. DCI format (e.g. format 1A)) in the USS. In some examples, this is when a slow grant message is detected.

Embodiments relating to further details of granting resources (in uplink or downlink) to a wireless device 300a as performed by the network node 200 and receiving granting of resources from a network node 200 as performed by the wireless device 300a, 300b will now be disclosed.

In general terms, a wireless device 300a, 300b configured for short TTI operation searches for slow grants (also referred to as slow DCIs) in the CSS of the PDCCH. If it finds such a grant, as in one embodiment of step S202, it might be scheduled in uplink or downlink with a short TTI operation.

The wireless device 300a, 300b can be configured to only search a limited set of the CSS for slow grants. Hence, according to an embodiment the slow grant is found by the wireless device 300a, 300b decoding less than all CSS available to the wireless device 300a, 300b in the PDCCH.

In one example, the wireless device 300a, 300b is configured to only search the CSS for one aggregation level, e.g. aggregation level 4, thus limiting the CSS to 4 positions when searching for slow grants. Hence, according to an embodiment the slow grant is found by the wireless device 300a, 300b searching for the slow grant in the CSS for only one aggregation level of CCEs.

When the wireless device 300a, 300b finds the slow grant, it might assume that the same aggregation level is used for all control (e.g. DCI) messages within the CSS. Hence, according to an embodiment the slow grant has an aggregation level of CCEs, and this aggregation level is used for all DCI messages within the CSS.

As a further example, when the wireless device 300a, 300b finds the slow grant, it might for the CSS assume either that the control (e.g. DCI) message uses the same aggregation level as the slow grant or that the DCI message uses the highest supported aggregation level (AL 8). Hence, according to an embodiment a highest supported aggregation level of CCEs is used for all control information messages within the CSS.

According to some aspects the wireless device 300a, 300b is configured to determine that the aggregation level of the second control message (e.g. USS in the PDCCH) is less or equal to the aggregation level of the detected first control message (e.g. slow grant in the CSS in the PDCCH). Hence, according to an embodiment the second control message or USS has an aggregation level of CCEs equal or smaller than the aggregation level of CCEs for the CSS (or first control message).

According to some aspects the wireless device 300a, 300b assumes a predefined small set of candidates for each aggregation level in the USS of the PDCCH when it has detected a slow grant. Hereinafter, a candidate is defined by the starting position, in terms of symbols within the USS, of the CCEs that define the DCI message. This number may even be zero candidates for some aggregation levels, e.g. to avoid checking many low-aggregation level candidates but at the same time keep the possibility to being scheduled on a robust high-aggregation level format if needed. Hence, according to an embodiment the above disclosed less than all available PDCCH candidates are defined by starting positions of the CCEs for each available aggregation level of CCEs in the USS.

References to aggregation level may refer to an aggregation level of a search space (e.g. CSS, USS), aggregation levels of CCEs or an aggregation level of a control message (e.g. a control message formed from aggregated CCEs in a search space).

According to some aspects, when the wireless device 300a, 300b detects a slow grant, it assumes that the same aggregation level is used for all DCI messages within the USS. Hence, according to an embodiment a common aggregation level of CCEs is used for all control information messages within the USS. In some examples, the wireless device determines a parameter of the first control message, e.g. slow grant. The parameter may be the aggregation level of the first control message. The determined aggregation level is used by the wireless device for decoding (or searching for) the second control message, e.g. in the USS. The network node operates according to the expected method of the wireless terminal, e.g. to send out the first and second control messages with the same aggregation level.

According to some aspects, when the wireless device 300a, 300b detects a slow grant, the wireless device determines for the second control message (e.g. in the USS) either that the DCI message has the same aggregation level as the first control message (e.g. slow grant) or determines that the second control message (e.g. DCI message) uses the highest supported aggregation level (e.g. AL 8). Hence, according to an embodiment the same aggregation level of CCEs is used in the USS as used in the slow grant (i.e. in the CSS), or highest supported aggregation level of CCEs, is used for the second control information message.

According to some aspects the wireless device 300a, 300b determines the second control message should be decoded using a subset (i.e. less than all) of the legacy USS for the DCI message, when the first control message (e.g. a slow grant) is detected. Hence, according to an embodiment less than all available PDCCH candidates are defined by a true subset of all available CCEs.

In one example the wireless device 300a, 300b is configured to attempt to decode the first half of the candidates for an aggregation level of CCEs. Hence, according to an embodiment, less than all available PDCCH candidates are defined by a first occurring half of PDCCH candidates of all available PDCCH candidates.

In another example the wireless device 300a, 300b is configured to attempt to decode every second candidate of each aggregation level of CCEs. Hence, according to an embodiment the above disclosed less than all available PDCCH candidates are defined by every second occurring PDCCH candidate of all available PDCCH candidates for each possible aggregation level of CCEs.

The wireless device may be configured by receiving signalling or by a parameter of an earlier (e.g. first) control message, including the detection (i.e. existence) of the earlier control message (e.g. a slow grant).

In a third example the wireless device 300a, 300b is configured to attempt to decode every second candidate of the aggregation level of CCEs with which the slow grant is transmitted. Hence, according to an embodiment the slow grant has an aggregation level of CCEs, and the above disclosed less than all available PDCCH candidates are defined by every second occurring PDCCH candidate of all available PDCCH candidates for the aggregation level of CCEs for the slow grant.

The wireless device 300a, 300b can be configured to only monitor one DCI format (e.g. format 1A) in the USS, when a slow grant is detected. Hence, according to an embodiment, based on the slow grant, the wireless device 300a, 300b searches for only one format of the second control information message in the USS.

The slow grant can be specific for a group of wireless devices 300a, 300b and be transmitted on a rate equal to or slower than once each sub-frame. In comparison, a fast grant can be device-specific and be transmitted on a faster rate than once each sub-frame, for example on a per symbol basis. In some examples a slow grant may be considered as a control message comprising information of a frequency band for short TTI operation of the wireless device. In some examples, the slow grant may be considered as a control message in a CSS, and/or the fast grant may be considered as control message in a USS. In some examples, a slow grant may be considered as control message transmitted once per subframe, and/or a fast grant may be considered as a control message type which is transmitted (or uses a time resources which allows transmission) a plurality of times per subframe (e.g. once per wireless terminal in sTTI operation served by a cell).

In some examples, the decoding or search for the second control message is determined from (i.e. based on) a receiving of the first control message or on a parameter of the first control message (e.g. the parameter is an aggregation level of the resources (e.g. CCEs)) of the first control message. In other examples, the decoding or search for the second control message is not based on a receiving of the first control message. The decoding or search for the second control message may be determined using signalling (e.g. separate signalling, e.g. on RRC), according to a predetermined value or parameter, or according to any example of the disclosure.

Any example of control message may also be referred to as a control information message.

Figure 6:
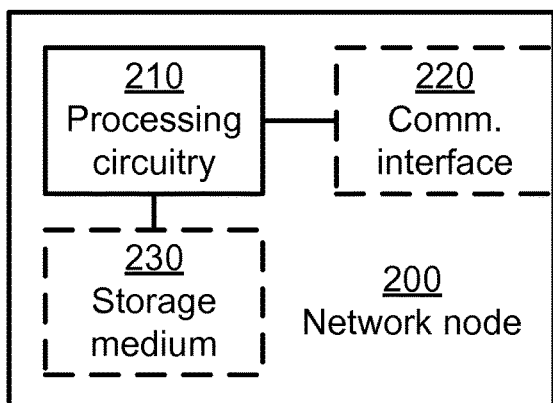
FIG. 6 is a schematic diagram showing functional units of a network node according to an embodiment.

FIG. 6 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S106, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications at least with a wireless device 300a, 300b. As such the communications interface 220 may comprise one or more transmitters and receivers, comprising analogue and digital components and a suitable number of antennas for wireless communications and ports for wireline communications.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 7:
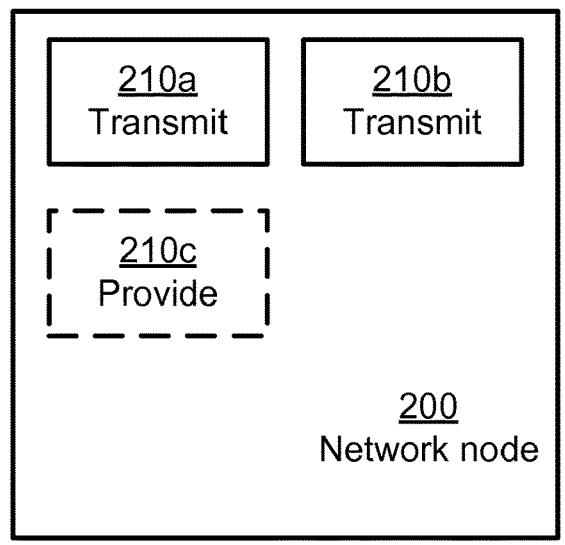
FIG. 7 is a schematic diagram showing functional modules of a network node according to an embodiment.

FIG. 7 schematically illustrates, in terms of a number of functional modules, the components of a network node 200 according to an embodiment. The network node 200 of FIG. 7 comprises a number of functional modules; a transmit module 210a configured to perform step S102, and a transmit module 210b configured to perform step S106. The network node 200 of FIG. 7 may further comprise a number of optional functional modules, such as a provide module 210C configured to perform step S104. In general terms, each functional module 210a-210c may be implemented in hardware or in software. Preferably, one or more or all functional modules 210a-210c may be implemented by the processing circuitry 210, possibly in cooperation with functional units 220 and/or 230. The processing circuitry 210 may thus be arranged to from the storage medium 230 fetch instructions as provided by a functional module 210a-210c and to execute these instructions, thereby performing any steps of the network node 200 as disclosed herein.

The network node 200 may be provided as a standalone device or as a part of at least one further device. For example, the network node 200 may be provided in a node of the radio access network 110 or in a node of the core network 120. For example, the network node 200, or at least its functionality, could be implemented in a radio base station, a base transceiver station, a NodeBs, an evolved NodeBs, an access points, or an access node. Alternatively, functionality of the network node 200 may be distributed between at least two devices, or nodes. These at least two nodes, or devices, may either be part of the same network part (such as the radio access network 110 or the core network 120) or may be spread between at least two such network devices, parts or nodes. In general terms, instructions that are required to be performed in real time may be performed in one or more device, or node, in the radio access network 110.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 6 the processing circuitry 210 may be distributed among a plurality of devices, or nodes. The same applies to the functional modules 210a-210c of FIG. 7 and the computer program 1020a of FIG. 10 (see below).

Figure 8:
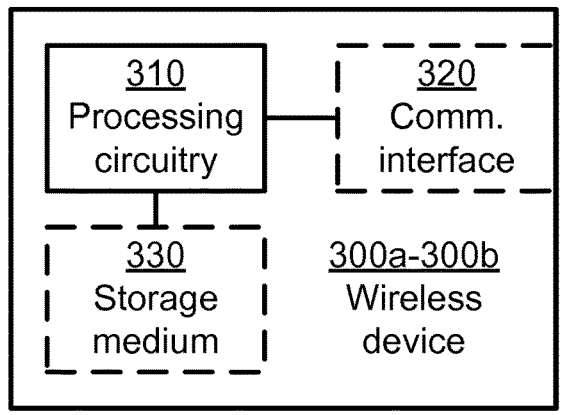
FIG. 8 is a schematic diagram showing functional units of a wireless device according to an embodiment.

FIG. 8 schematically illustrates, in terms of a number of functional units, the components of a wireless device 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the wireless device 300a, 300b to perform a set of operations, or steps, S202-S208, as disclosed above. For example, the storage medium 330 may store the set of operations, and the processing circuitry 310 may be configured to retrieve the set of operations from the storage medium 330 to cause the wireless device 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 300a, 300b may further comprise a communications interface 320 for communications at least with a network node 200. As such the communications interface 320 may comprise one or more transmitters and receivers, comprising analogue and digital components and a suitable number of antennas for wireless communications and ports for wireline communications.

The processing circuitry 310 controls the general operation of the wireless device 300a, 300b e.g. by sending data and control signals to the communications interface 320 and the storage medium 330, by receiving data and reports from the communications interface 320, and by retrieving data and instructions from the storage medium 330. Other components, as well as the related functionality, of the wireless device 300a, 300b are omitted in order not to obscure the concepts presented herein.

Figure 9:
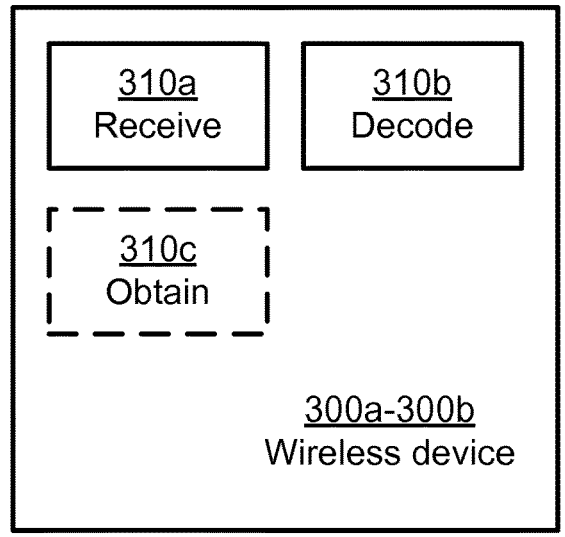
FIG. 9 is a schematic diagram showing functional modules of a wireless device according to an embodiment.

FIG. 9 schematically illustrates, in terms of a number of functional modules, the components of a wireless device 300a, 300b according to an embodiment. The wireless device 300a, 300b of FIG. 9 comprises a number of functional modules; a receive module 310a configured to perform step S202, and a decode module 310b configured to perform step S206. The wireless device 300a, 300b of FIG. 9 may further comprise a number of optional functional modules, such as an obtain module 310c configured to perform step S204. In general terms, each functional module 310a-310c may be implemented in hardware or in software. Preferably, one or more or all functional modules 310a-310c may be implemented by the processing circuitry 310, possibly in cooperation with functional units 320 and/or 330. The processing circuitry 310 may thus be arranged to from the storage medium 330 fetch instructions as provided by a functional module 310a-310c and to execute these instructions, thereby performing any steps of the wireless device 300a, 300b as disclosed herein.

Figure 10:
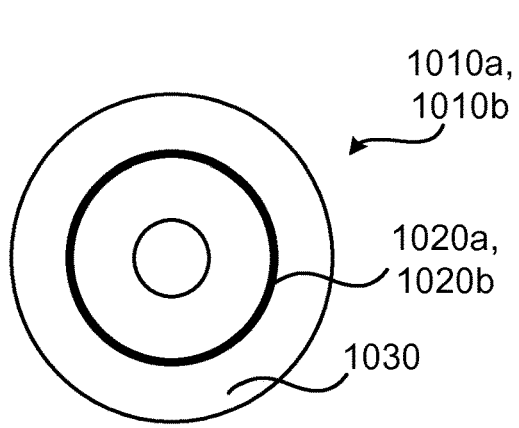
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the network node 200 as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the wireless device 300a, 300b as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

An LTE subframe lasting 1 ms contains 14 OFDM symbols for normal CP. A New Radio (5G), NR, subframe may have a fixed duration of 1 ms and may therefore contain a different number of OFDM symbols for different subcarrier spacings. An LTE slot corresponds to 7 OFDM symbols for normal CP. An NR slot corresponds to 7 or 14 OFDM symbols; at 15 kHz subcarrier spacing, a slot with 7 OFDM symbols occupies 0.5 ms. Concerning NR terminology, reference is made to 3GPP TR 38.802 v14.0.0 and later versions.

Aspects of the disclosure may be applicable to either LTE or NR radio communications. References to a short TTI may alternatively be considered as a mini-slot, according to NR terminology. The mini-slot may have a length of 1 symbol, 2 symbols, 3 or more symbols, or a length of between 1 symbol and a NR slot length minus 1 symbol. The short TTI may have a length of 1 symbol, 2 symbols, 3 or more symbols, an LTE slot length (7 symbols) or a length of between 1 symbol and a LTE subframe length minus 1 symbol. The short TTI, or mini-slot may be considered as having a length less than 1 ms or less than 0.5 ms.

The inventive concept has mainly been described above with reference to a few embodiments. However, as is readily appreciated by a person skilled in the art, other embodiments than the ones disclosed above are equally possible within the scope of the inventive concept, as defined by the appended claims.

The invention claimed is:

1. A method performed by a network node, the method comprising:
   transmitting, to a wireless device operating with a short Transmission Time Interval (sTTI), a first control information message comprising a grant of resources for a downlink channel; and
   transmitting, to the wireless device based on a parameter of the first control information message, a second control information message in a device-specific search space (USS) or in a common search space (CSS);
   wherein the first control information message defines a frequency band for sTTI operation in an uplink and/or downlink shared channel; and
   wherein the second control information message is comprised in the defined frequency band.

2. The method of claim 1, wherein the first control information message is transmitted in the CSS and/or in a physical downlink control channel (PDCCH).

3. The method of claim 1, wherein:
   the parameter is an aggregation level of a search space of the first control information message; and
   the aggregation level is used by the wireless device for decoding of the second control information message.

4. The method of claim 1, further comprising providing, to the wireless device in a radio resource control message, an indication defining which PDCCH candidates to use in the USS.

5. The method of claim 1, wherein:
the first control information message has an aggregation level of CCEs used for all control messages within the CSS; and/or
a highest supported aggregation level of CCEs is used for all messages within the CSS; and/or
the USS has an aggregation level of CCEs equal to, or smaller than, an aggregation level of CCEs for the CSS; and/or
less than all available physical downlink control channel candidates are defined by starting positions of CCEs for each available aggregation level of CCEs in the USS; and/or
a common aggregation level of CCEs is used for all control information messages within the USS; and/or
a same aggregation level of CCEs as the first control information message, or a highest supported aggregation level of CCEs, is used for the second control information message.

6. The method of claim 5, wherein the less than all available control channel candidates are defined by a subset of all available control channel candidates.

7. The method of claim 5, wherein:
the less than all available control channel candidates are defined by a first occurring half of control channel candidates of all available control channel candidates; and/or
the less than all available control channel candidates are defined by every second occurring control channel candidate of all available control channel candidates for each possible aggregation level of CCEs; and/or
the second control information message has an aggregation level of CCEs and less than all available control channel candidates are defined by every second occurring control channel candidates of all available control channel candidates for the aggregation level of CCEs.

8. A method performed by a wireless device operating with a short Transmission Time Interval (sTTI), the method comprising:
receiving a first control information message comprising a grant of resources for a downlink channel; and
decoding, based on a parameter of the first control information message, a second control information message in a device-specific search space (USS) or in a common search space (CSS);
wherein the first control information message defines a frequency band for sTTI operation in an uplink and/or downlink shared channel; and
wherein the second control information message is comprised in the defined frequency band.

9. The method of claim 8, wherein the first control information message is received in the CSS and/or in a physical downlink control channel.

10. The method of claim 8, wherein:
the parameter is an aggregation level of a search space of the first control information message; and
the aggregation level is used by the wireless device for decoding of the second control information message.

11. The method of claim 8, further comprising obtaining, from a network node and in a radio resource control message, an indication defining which physical downlink control channel candidates to use in the USS.

12. The method of claim 8, further comprising:
searching, based on the first control information message, for only one format of the second control information message in the USS; and/or
finding a slow grant by decoding less than all CSS available to the wireless device in a physical downlink control channel.

13. The method of claim 8, further comprising finding the first control information message by searching for the first control information message in the CSS for only one aggregation level of Control Channel Elements (CCEs).

14. The method of claim 8, wherein:
the first control information message has an aggregation level of CCEs used for all control messages within the CSS; and/or
a highest supported aggregation level of CCEs is used for all messages within the CSS; and/or
the USS has an aggregation level of CCEs equal to, or smaller than, an aggregation level of CCEs for the CSS; and/or
less than all available physical downlink control channel candidates are defined by starting positions of CCEs for each available aggregation level of CCEs in the USS; and/or
a common aggregation level of CCEs is used for all control information messages within the USS; and/or
a same aggregation level of CCEs as the first control information message, or a highest supported aggregation level of CCEs, is used for the second control information message.

15. The method of claim 14, wherein the less than all available control channel candidates are defined by a subset of all available control channel candidates.

16. The method of claim 14, wherein:
the less than all available control channel candidates are defined by a first occurring half of control channel candidates of all available control channel candidates; and/or
the less than all available control channel candidates are defined by every second occurring control channel candidate of all available control channel candidates for each possible aggregation level of CCEs; and/or
the second control information message has an aggregation level of CCEs and less than all available control channel candidates are defined by every second occurring control channel candidates of all available control channel candidates for the aggregation level of CCEs.

17. A network node comprising:
processing circuitry configured to cause the network node to:
transmit, to a wireless device operating with a short Transmission Time Interval (sTTI), a first control information message comprising a grant of resources for a downlink channel; and
transmit, to the wireless device, based on a parameter of the first control information message, a second control information message in a device-specific search space (USS) or in a common search space (CSS);
wherein the first control information message defines a frequency band for sTTI operation in an uplink and/or downlink shared channel; and
wherein the second control information message is comprised in the defined frequency band.

18. A wireless device configured to operate with a short Transmission Time Interval (sTTI), the wireless device comprising:
processing circuitry configured to cause the wireless device to:
receive a first control information message comprising a grant of resources for a downlink channel; and decode, based on a parameter of the first control information message, a second control information message in a device-specific search space (USS) or in a common search space (CSS);

wherein the first control information message defines a frequency band for sTTI operation in an uplink and/or downlink shared channel; and wherein the second control information message is comprised in the defined frequency band.

* * * * *